US012705175B2

(12) United States Patent
Wang et al.

(10) Patent No.: US 12,705,175 B2
(45) Date of Patent: Aug. 11, 2026

(54) DATA TRANSMISSION METHOD, SYSTEM AND APPARATUS, AND NON-TRANSITORY READABLE STORAGE MEDIUM AND ELECTRONIC DEVICE

(71) Applicant: SUZHOU METABRAIN INTELLIGENT TECHNOLOGY CO., LTD., Suzhou (CN)

(72) Inventors: Yanwei Wang, Suzhou (CN); Cheng Huang, Suzhou (CN); Jiaheng Fan, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/142,833

(22) PCT Filed: Aug. 8, 2024

(86) PCT No.: PCT/CN2024/110823

§ 371 (c)(1), (2) Date: Jun. 24, 2025

(87) PCT Pub. No.: WO2025/097897

PCT Pub. Date: May 15, 2025

(65) Prior Publication Data

US 2026/0119403 A1 Apr. 30, 2026

(30) Foreign Application Priority Data

Nov. 8, 2023 (CN) ......................... 202311478015.4

(51) Int. Cl.

*G06F 12/0831* (2016.01)
*G06F 13/28* (2006.01)

(Continued)

(52) U.S. Cl.

CPC .......... *G06F 12/0831* (2013.01); *G06F 13/28* (2013.01); *G06F 13/38* (2013.01); *G06F 13/42* (2013.01); *G06F 2213/0026* (2013.01)

(58) Field of Classification Search

CPC ..................... G06F 2213/0026; G06F 12/0831
See application file for complete search history.

(56) References Cited

U.S. PATENT DOCUMENTS 7,756,943 B1 * 7/2010 Wong ...................... G06F 9/544 709/212
2005/0198414 A1 * 9/2005 Sugimoto .............. G06F 13/28 710/52

(Continued)

FOREIGN PATENT DOCUMENTS

CN 109840216 A 6/2019
CN 110083548 A 8/2019

(Continued)

*Primary Examiner* — Henry Tsai
*Assistant Examiner* — Aurangzeb Hassan
(74) *Attorney, Agent, or Firm* — IPro, PLLC

(57) ABSTRACT

The present disclosure provides a data transmission method. The method includes: receiving a data transmission request of a first transmission protocol sent by a data request device, where the data transmission request is configured to indicate that a transmission operation is to be performed on data in a first storage space of a data response device, and a second storage space is deployed on the data response device, the second storage space is configured to store partial data in the first storage space; performing data synchronization on the second storage space and the first storage space according to first protocol information of a second transmission protocol on the data response device in response to the data transmission request, the second transmission protocol is configured to maintain data synchronization between the second storage space and the first storage space; and performing the transmission operation on the first storage space.

20 Claims, 4 Drawing Sheets

(51) Int. Cl.
*G06F 13/38* (2006.01)
*G06F 13/42* (2006.01)

(56) References Cited

U.S. PATENT DOCUMENTS

| | | | | |
|---|---|---|---|---|
| 2005/0210203 | A1* | 9/2005 | Stenstrom | G06F 12/0831 711/144 |
| 2015/0178202 | A1 | 6/2015 | Sankaran et al. | |
| 2017/0286363 | A1* | 10/2017 | Joshua | G06F 3/061 |
| 2019/0272123 | A1* | 9/2019 | Gissin | G06F 3/0659 |
| 2020/0097407 | A1 | 3/2020 | Kimelman et al. | |
| 2021/0326075 | A1* | 10/2021 | Kim | G06F 3/0679 |
| 2023/0195662 | A1* | 6/2023 | Kalyanasundharam | G06F 13/1673 |
| 2024/0264968 | A1* | 8/2024 | Linstead | G06F 13/4221 |
| 2025/0358332 | A1* | 11/2025 | Cao | G06F 15/17331 |

FOREIGN PATENT DOCUMENTS

| | | | |
|---|---|---|---|
| CN | 112835519 | A | 5/2021 |
| CN | 113055196 | A | 6/2021 |
| CN | 115514698 | A | 12/2022 |
| CN | 115904809 | A | 4/2023 |
| CN | 116701526 | A | 9/2023 |
| CN | 117201518 | A | 12/2023 |

* cited by examiner

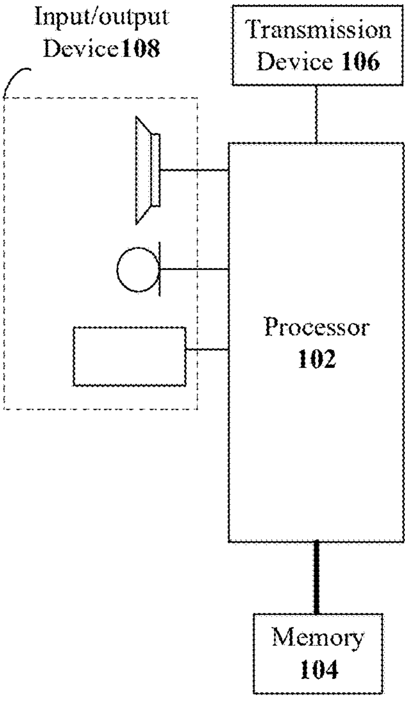

FIG. 1

Data transmission request of a first transmission protocol sent by a data request device is received, where the data transmission request is configured to indicate that a transmission operation is to be performed on data in a first storage space of a data response device, and a second storage space is further deployed on the data response device, where the second storage space is configured to store partial data in the first storage space — S202

Data synchronization is performed on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space — S204

The transmission operation is performed on the first storage space — S206

FIG. 2

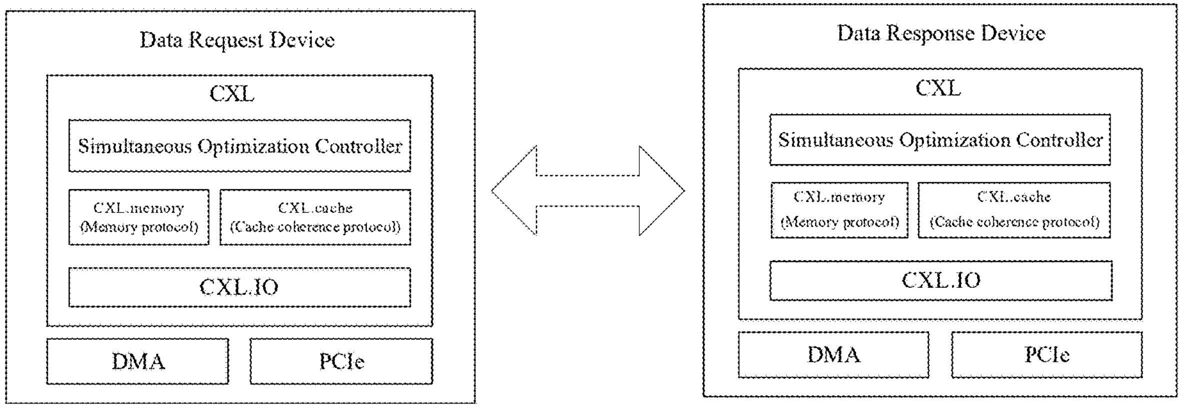

FIG. 5

Data transmission request of a first transmission protocol is sent to a data response device, where the data transmission request is configured to indicate that a transmission operation is to be performed on data in a first storage space of a data response device, and a second storage space is further deployed on the data response device, where the second storage space is configured to store partial data in the first storage space, and the data response device is configured to perform the transmission operation on the first storage space after performing data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space — S602

Information returned by the data response device after performing the transmission operation on the first storage space is received — S604

FIG. 6

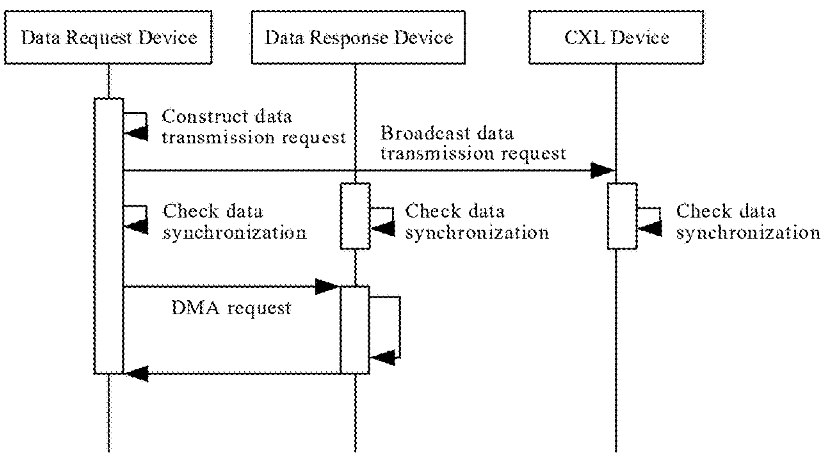

FIG. 7

DATA TRANSMISSION METHOD, SYSTEM AND APPARATUS, AND NON-TRANSITORY READABLE STORAGE MEDIUM AND ELECTRONIC DEVICE

CROSS-REFERENCE TO RELATED APPLICATION

The present disclosure claims the priority of Chinese patent application filed on Nov. 8, 2023 before the CNIPA, China National Intellectual Property Administration with the application number of 202311478015.4, and the title of "DATA TRANSMISSION METHOD, SYSTEM AND APPARATUS, STORAGE MEDIUM AND ELECTRONIC DEVICE", which is incorporated herein in its entirety by reference.

FIELD

The present disclosure relates to the field of computers, and more particularly to a data transmission method, system and apparatus, a non-transitory readable storage medium and an electronic device.

BACKGROUND

With the development of computer technologies, it is realized to expand storage space for computer devices at present. However, the inconsistency of data among a plurality of storage spaces of the same computer device makes computer devices responding in a process of data transmission between computer devices unable to correctly perform transmission operations requested by computer devices that initiated requests. In the related art, the consistency of transmission is generally realized by controlling the computer devices to use only a part of storage space for the transmission operations between the computer devices, but this manner will reduce the amount of data that the computer devices can transmit.

In view of relatively low efficiency in data transmission in related art, no effective solutions have been proposed.

SUMMARY

The present disclosure provides a data transmission method, system and apparatus, a non-transitory readable storage medium and an electronic device, so as to at least solve the problem of relatively low efficiency in data transmission in the related art.

According to an embodiment of the present disclosure, there is provided a data transmission method, including:

receiving a data transmission request of a first transmission protocol sent by a data request device, where the data transmission request is configured to indicate that a transmission operation is to be performed on data in a first storage space of a data response device, and a second storage space is further deployed on the data response device, where the second storage space is configured to store partial data in the first storage space;

performing data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and performing the transmission operation on the first storage space.

In an exemplary embodiment, the performing data synchronization on the second storage space and the first storage space according to the first protocol information of the second transmission protocol on the data response device includes: querying a target storage state of the target data from a storage state of the second transmission protocol recorded on the data response device in response to target data of a storage location where the transmission operation is to be performed indicated by the data transmission request being stored in the second storage space, where the first protocol information includes the storage state, and the storage state is configured to indicate a synchronization state of data stored in the second storage space; and synchronizing the target data to the first storage space in response to the target storage state being a target state, where the target state is configured to indicate that the target data is modified but not synchronized.

In an exemplary embodiment, the querying the target storage state of the target data from the storage state of the second transmission protocol recorded on the data response device includes: requesting to invoke the first protocol information of the second transmission protocol to the data response device; and querying the target storage state of the target data from the first protocol information of the second transmission protocol in response to the data response device allowing the first protocol information of the second transmission protocol to be invoked.

In an exemplary embodiment, the synchronizing the target data to the first storage space includes: triggering a synchronization operation of the second transmission protocol for the target data in the second storage space; and converting the target state into a non-target state in response to the target data being synchronized to the first storage space, where the non-target state is configured to indicate that the target data has been synchronized.

In an exemplary embodiment, the querying the target storage state of the target data from the storage state of the second transmission protocol recorded on the data response device includes: querying a target cache state label of the target data from a cache state label of a compute express link protocol recorded on the data response device, where the second transmission protocol includes the compute express link protocol, the storage state includes the cache state label, the first storage space is a memory space on the data response device, and the second storage space is a cache space on the data response device; and the synchronizing the target data to the first storage space in response to the target storage state being a target state includes: triggering a cache consistency operation of the compute express link protocol for the target data in the cache space in response to the target cache state label being a modified label.

In an exemplary embodiment, the performing data synchronization on the second storage space and the first storage space according to the first protocol information of the second transmission protocol on the data response device includes: detecting transmission protocols supported by the data response device; selecting the second transmission protocol whose function conforms to storage types of the first storage space and the second storage space from the transmission protocols supported by the data response device; and performing data synchronization on the second storage space and the first storage space according to the first protocol information of the second transmission protocol.

In an exemplary embodiment, the performing data synchronization on the second storage space and the first storage space according to the first protocol information of the second transmission protocol on the data response device includes: performing data synchronization on the data response device according to the first protocol information of the second transmission protocol on the data response device, and performing data synchronization on one or more protocol devices connected to the data response device through the second transmission protocol.

In an exemplary embodiment, the performing data synchronization on the data response device according to the first protocol information of the second transmission protocol on the data response device, and performing data synchronization on the one or more protocol devices connected to the data response device through the second transmission protocol includes: performing data synchronization on the data response device according to first protocol information of the compute express link protocol on the data response device, and performing data synchronization on one or more compute express link devices connected to the data response device through the compute express link protocol.

In an exemplary embodiment, the receiving the data transmission request of the first transmission protocol sent by the data request device includes: receiving a first request of the first transmission protocol sent by the data request device, where the first request is configured to indicate the data response device to perform data synchronization on data at a target location in the first storage space, and the data transmission request includes the first request.

In an exemplary embodiment, the performing the transmission operation on the first storage space includes: receiving a second request of the first transmission protocol sent by the data request device, where the second request is configured to request to perform the transmission operation on the data at the target location in the first storage space; and performing the transmission operation on the data at the target location in the first storage space in response to the second request.

According to another embodiment of the present disclosure, there is further provided a data transmission method, including:

- sending a data transmission request of a first transmission protocol to a data response device, where the data transmission request is configured to indicate that a transmission operation is to be performed on data in a first storage space of a data response device, and a second storage space is further deployed on the data response device, where the second storage space is configured to store partial data in the first storage space, and the data response device is configured to perform the transmission operation on the first storage space after performing data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and
- receiving information returned by the data response device after performing the transmission operation on the first storage space.

In an exemplary embodiment, the sending the data transmission request of the first transmission protocol to the data response device includes:

- sending a first request of the first transmission protocol to the data response device, where the first request is configured to indicate the data response device to perform data synchronization on data at a target location in the first storage space, and the data transmission request includes the first request.

In an exemplary embodiment, the sending the first request of the first transmission protocol to the data response device includes: creating the first request carrying the target location; and sending the first request to the data response device through a bus of the first transmission protocol connected to the data response device.

In an exemplary embodiment, the sending the first request to the data response device through the bus of the first transmission protocol connected to the data response device includes: broadcasting the first request to the data response device and one or more protocol devices connected to the data response device through the second transmission protocol through the bus of the first transmission protocol connected to the data response device, where the data response device and the one or more protocol devices are configured to perform data synchronization on the data at the target location in response to the first request.

In an exemplary embodiment, the receiving the information returned by the data response device after performing the transmission operation on the first storage space includes: sending a second request of the first transmission protocol to the data response device, where the second request is configured to request to perform the transmission operation on data at a target location in the first storage space; and receiving the information returned by the data response device in response to the second request.

In an exemplary embodiment, before sending the second request of the first transmission protocol to the data response device, the method further includes: performing data synchronization on a third storage space and a fourth storage space in response to the transmission operation including a data write operation, where the third storage space is configured to store data on which the data write operation is performed, and the fourth storage space is configured to store partial data in the third storage space.

In an exemplary embodiment, the performing data synchronization on the third storage space and the fourth storage space includes: obtaining second protocol information of the second transmission protocol in response to the data on which the data write operation is performed being stored in the fourth storage space, where the second protocol information is configured to indicate a data synchronization situation between the third storage space and the fourth storage space; and performing data synchronization on the third storage space and the fourth storage space according to the second protocol information.

According to another embodiment of the present disclosure, there is provided a data transmission system, including: a data request device and a data response device, where a first storage space and a second storage space are deployed on the data response device, both the data request device and the data response device support a first transmission protocol, and the data response device further supports a second transmission protocol, where the second transmission protocol is configured to maintain data synchronization between the second storage space and the first storage space; the data request device is configured to perform corresponding steps in any one of the above method embodiments; and the data response device is configured to perform corresponding steps in any one of the above method embodiments.

According to another embodiment of the present disclosure, there is provided a data transmission apparatus, including:

- a first receiving module configured to receive a data transmission request of a first transmission protocol sent by a data request device, where the data transmission request is configured to indicate that a transmission operation is to be performed on data in a first storage space of a data response device, and a second storage space is further deployed on the data response device, where the second storage space is configured to store partial data in the first storage space;
- a first synchronization module configured to perform data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and
- a transmission module configured to perform the transmission operation on the first storage space.

According to another embodiment of the present disclosure, there is provided a data transmission apparatus, including:

- a sending module configured to send a data transmission request of a first transmission protocol to a data response device, where the data transmission request is configured to indicate that a transmission operation is to be performed on data in a first storage space of a data response device, and a second storage space is further deployed on the data response device, where the second storage space is configured to store partial data in the first storage space, and the data response device is configured to perform the transmission operation on the first storage space after performing data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and
- a second receiving module configured to receive information returned by the data response device after performing the transmission operation on the first storage space.

According to another embodiment of the present disclosure, there is further provided a non-transitory readable storage medium, where the non-transitory readable storage medium stores a computer program, where the computer program, when executed by a processor, causes the processor to perform steps in any one of the above method embodiments.

According to another embodiment of the present disclosure, there is further provided an electronic device, including: a memory, a processor and a computer program stored on the memory and executable on the processor, where the computer program, when executed by the processor, causes the processor to perform steps in any one of the above method embodiments.

Through the present disclosure, the data transmission request of the first transmission protocol sent by the data request device is received, where the data transmission request is configured to indicate that the transmission operation is to be performed on the data in the first storage space of the data response device, and the second storage space is further deployed on the data response device, where the second storage space is configured to store the partial data in the first storage space; data synchronization is performed on the second storage space and the first storage space according to first protocol information of the second transmission protocol on the data response device in response to the data transmission request, where the second transmission protocol is configured to maintain data synchronization between the second storage space and the first storage space, and the first protocol information is configured to indicate the data synchronization situation between the second storage space and the first storage space; and the transmission operation is performed on the first storage space. Since the first protocol information is configured to obtain the data synchronization situation between the second storage space and the first storage space, and the second transmission protocol is configured to maintain data synchronization between the second storage space and the first storage space, in the case where the data transmission request of the first transmission protocol is received, data synchronization is performed on the second storage space and the first storage space based on the first protocol information of the second transmission protocol on the data response device, and then the transmission operation is performed, the consistency of the data between the second storage space and the first storage space may be ensured. Therefore, the problem of relatively low efficiency in data transmission may be solved, and the effect of improving the efficiency of data transmission may be realized.

BRIEF DESCRIPTION OF THE DRAWINGS

FIG. 1 is a block diagram of a hardware structure of a server device for a data transmission method according to an embodiment of the present disclosure.

FIG. 2 is a flowchart of a data transmission method according to an embodiment of the present disclosure.

FIG. 5 is a schematic diagram of a data request device and a data response device according to an embodiment of the present disclosure.

FIG. 6 is a flowchart of another data transmission method according to an embodiment of the present disclosure.

FIG. 7 is a schematic diagram of a process of data transmission between a data request device and a data response device according to an embodiment of the present disclosure.

DETAILED DESCRIPTION

Figure 3:
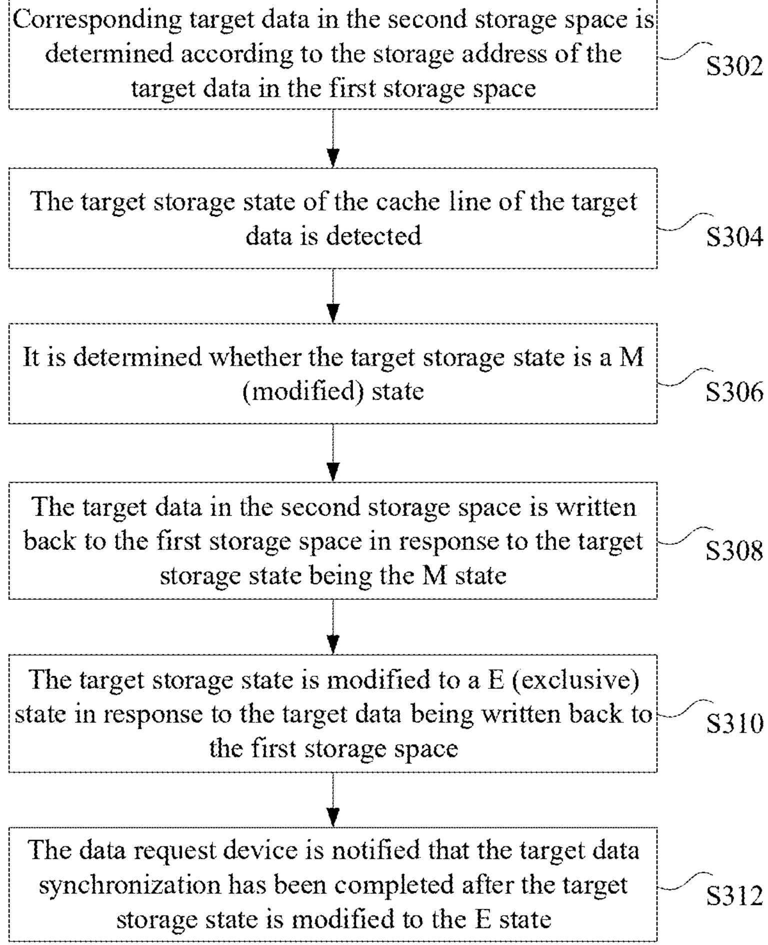
FIG. 3 is a flowchart of an execution process of data synchronization according to an embodiment of the present disclosure.

Hereinafter, embodiments of the present disclosure will be described in detail with reference to accompanying drawings and in combination with the embodiments.

It should be noted that terms "first", "second", and the like in the specification and claims of the present disclosure and the accompanying drawings are used to distinguish similar objects and do not necessarily need to be used to describe a specific order or sequence.

Method embodiments provided in the embodiments of the present disclosure may be executed in a server device or a similar computing apparatus. Taking running on a server device as an example, FIG. 1 is a block diagram of a hardware structure of a server device for a data transmission method according to an embodiment of the present disclosure. As shown in FIG. 1, the server device may include one or more (there is only one shown in FIG. 1) processors 102 (the processors 102 may include, but are not limited to, processing apparatuses such as microprocessors MCU or programmable logic devices FPGA) and a memory 104 configured to store data. The above server device may further include a transmission device 106 configured to achieve a communication function and an input/output device 108. A person skilled in the art can understand that the structure shown in FIG. 1 is only schematic, which does not limit the structure of the above server device. For example, the server device may further include more or less components than those shown in FIG. 1, or have different configurations from those shown in FIG. 1.

The memory 104 may be configured to store a computer program, for example, a software program of application software and a module, for example, a computer program corresponding to a data transmission method in the embodiments of the present disclosure. The processor 102 runs the computer program stored in the memory 104, so as to execute various functional applications and data processing, that is, to realize the above method. The memory 104 may include a high speed random access memory, and may further include a non-transitory memory, for example, one or more magnetic storage apparatuses, a flash memory, or other non-transitory solid-state memories. In some examples, the memory 104 may include memories remotely disposed relative to the processor 102. These remote memories may be connected to the server device via a network. Examples of the above network include, but are not limited to, the Internet, an intranet, a local area network, a mobile communication network, and a combination thereof.

The transmission device 106 is configured to receive or send data via the network. An example of the above network may include a wireless network provided by a communication provider of the server device. In an example, the transmission device 106 includes a network interface controller (NIC), and may be connected to other network devices through a base station, so as to communicate with the Internet. In an example, the transmission device 106 is a radio frequency (RF) module, which is configured to communicate with the Internet in a wireless manner.

In this embodiment, there is provided a data transmission method. FIG. 2 is a flowchart of a data transmission method according to an embodiment of the present disclosure. As shown in FIG. 2, the flowchart includes following steps:

step S202, a data transmission request of a first transmission protocol sent by a data request device is received, where the data transmission request is configured to indicate that a transmission operation is to be performed on data in a first storage space of a data response device, and a second storage space is further deployed on the data response device, where the second storage space is configured to store partial data in the first storage space;

step S204, data synchronization is performed on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and step S206, the transmission operation is performed on the first storage space.

Through the above steps, the data transmission request of the first transmission protocol sent by the data request device is received, where the data transmission request is configured to indicate that the transmission operation is to be performed on the data in the first storage space of the data response device, and the second storage space is further deployed on the data response device, where the second storage space is configured to store the partial data in the first storage space; data synchronization is performed on the second storage space and the first storage space according to first protocol information of the second transmission protocol on the data response device in response to the data transmission request, where the second transmission protocol is configured to maintain data synchronization between the second storage space and the first storage space, and the first protocol information is configured to indicate the data synchronization situation between the second storage space and the first storage space; and the transmission operation is performed on the first storage space. Since the first protocol information is configured to obtain the data synchronization situation between the second storage space and the first storage space, and the second transmission protocol is configured to maintain data synchronization between the second storage space and the first storage space, in the case where the data transmission request of the first transmission protocol is received, data synchronization is performed on the second storage space and the first storage space based on the first protocol information of the second transmission protocol on the data response device, and then the transmission operation is performed, the consistency of the data between the second storage space and the first storage space may be ensured. Therefore, the problem of relatively low efficiency in data transmission may be solved, and the effect of improving the efficiency of data transmission may be realized.

In this embodiment, the data transmission method proposed in the present disclosure may be applied in a wide range of scenarios, including but not limited to: file transmission, audio transmission, video transmission, data packet transmission, and the like. In following embodiments, the above data transmission method may be explained by taking a file transmission scenario as an example, but the usage scenario is not limited, and any scenario that requires data transmission may use the data transmission method proposed in the present disclosure. The above data transmission method may be applied in, but is not limited to, scenarios including the data response device and the data request device, and the data response device and the data request device may be, but are not limited to, different devices according to different scenarios.

In the technical solution provided in the above step S202, the above data transmission method may be applied to, but is not limited to, the data response device. The data response device may include, but is not limited to, a device capable of receiving and responding to the data transmission request sent by data request device, for example, a graphics processing unit (GPU), a central processing unit (CPU), a network adapter, a storage controller, a peripheral control device, and the like.

In this embodiment, the storage space on the data response device may, but is not limited to, be divided into a first storage space and a second storage space. For example, the storage space on the data response device is divided into the first storage space and the second storage space. Alternatively, a memory space and a cache space with corresponding sizes are directly allocated to the data response device.

In this embodiment, the storage space on the data response device may include, but is not limited to, a memory space and a cache space. The memory space may, but is not limited to, be used as the first storage space and the cache space is used as the second storage space. The second storage space is configured to store partial data in the first storage space. For example, the first storage space is a memory space and the second storage space is a cache space, and the cache space is configured to store partial data in the memory space, thereby improving the access speed to the memory space.

In this embodiment, the first transmission protocol may be, but is not limited to, a protocol that can be recognized by the data response device. The data response device may, but is not limited to, determine data that the data request device needs to perform the transmission operation according to the data transmission request of the first transmission protocol. The transmission operation that the data response device can perform on the first storage space may include, but is not limited to: reading the data stored in the first storage space, writing the data to the first storage space, and the like.

In this embodiment, the above data request device may include, but is not limited to, a graphics processing unit (GPU), a central processing unit (CPU), a network adapter, a memory controller, an audio device, a peripheral control device, and the like.

In this embodiment, in the case where the data response device receives the data transmission request of the first transmission protocol, the data response device may, but is not limited to, be configured to determine data on which the transmission operation is to be performed according to the data transmission request. For example, a storage address of the data on which the transmission operation is to be performed in the first storage space is obtained from the data transmission request, and a storage address of the data on which the transmission operation is to be performed in the second storage space is determined according to an address mapping relationship between the first storage space and the second storage space, so as to determine the data on which the transmission operation is to be performed. Alternatively, the storage address of the data on which the transmission operation is to be performed in the second storage space is obtained from the data transmission request, so as to directly determine the data on which the transmission operation is to be performed. The data transmission request may, but is not limited to, be configured to indicate one or more data on which the transmission operation is to be performed, and in the case where the data transmission request indicates a plurality of data on which the transmission operation is to be performed, each of the plurality of data on which the transmission operation is to be performed may, but is not limited to, be determined as target data to perform the transmission operation.

In this embodiment, the data transmission request of the first transmission protocol is configured to indicate that the transmission operation is to be performed on data in the first storage space of the data response device. Taking the first storage space being a memory space as an example, the first transmission protocol may be, but is not limited to, a protocol that can directly access the memory space of the data response device for read and write operations, for example, a direct memory access (DMA) and an ultra direct memory access (UDMA).

In this embodiment, data transmission requests with different functions may, but is not limited to, be used in different scenarios. For example, target data on which a transmission operation is to be performed and the transmission operation are indicated to a data response device through a data transmission request, and the data response device can determine the target data on which the transmission operation is to be performed according to the data transmission request and perform a data synchronization operation and a data transmission operation according to the data transmission request. Alternatively, the target data on which the transmission operation is to be performed may, but is not limited to, be indicated to the data response device through the data transmission request, and the data response device can only perform the data synchronization operation corresponding to the data transmission request after receiving the data transmission request.

In this embodiment, for the same data stored in the second storage space and the first storage space, data corresponding to the second storage space may, but is not limited to, be obtained by searching from the first storage space based on a corresponding relationship between the second storage space and the first storage space. Alternatively, data corresponding to the first storage space may, but is not limited to, be obtained by searching from the second storage space. The corresponding relationship between the second storage space and the first storage space may include, but is not limited to, a mapping relationship between the storage address of the second storage space and the storage address of the first storage space, or an unique data identifier of the data stored in the first storage space and the second storage space.

In an exemplary embodiment, the data transmission request of the first transmission protocol sent by the data request device may, but is not limited to, be received in the following manners: receiving a first request of the first transmission protocol sent by the data request device, where the first request is configured to indicate the data response device to perform data synchronization on data at a target location in the first storage space, and the data transmission request includes the first request.

In this embodiment, the first transmission protocol may be, but is not limited to, a protocol that can be recognized by the data response device. The first request may, but is not limited to, be transmitted through the first transmission protocol, in the case where the data response device parses the first transmission protocol, the first request can be obtained and the data transmission operation or the data synchronization operation can be indicated according to the first request.

In this embodiment, the first request may, but is not limited to, be configured to indicate a storage location of data on which the transmission operation is to be performed in the storage space. For example, the first request is configured to indicate a storage location of the data on which the transmission operation is to be performed in the first storage space. Alternatively, the first request is configured to indicate a storage location of the data on which the transmission operation is to be performed in the second storage space. The data on which the transmission operation is to be performed may include, but is not limited to, data on which data synchronization is to be performed. The first request may further, but is not limited to, be configured to indicate the data response device to perform data synchronization on data at a target location in the first storage space. For example, the data response device may perform data synchronization on the data at the target location according to the first request, and perform the data transmission operation after completing data synchronization. Alternatively, the data response device performs data synchronization on the data at the target location according to the first request, and then performs the data transmission operation after receiving a request for the data transmission operation.

In this embodiment, the data response device is capable of performing data synchronization operation on the data at the target location in the first storage space. For example, taking the first transmission protocol being DMA as an example, the target location may, but is not limited to, be carried in the DMA, so that the data response device may perform data synchronization operation according to the target location and transmit data. Alternatively, the first request is transmitted through the DMA, and the data response device is indicated to perform data synchronization operation according to the target location through the first request.

Alternatively, the first request may, but is not limited to, be carried in the first transmission protocol to enable the data response device to perform data synchronization operation on the data at the target location in the first storage space. For example, taking the first transmission protocol being the DMA as an example, the first request may, but is not limited to, be carried in the DMA to enable the data response device to obtain the target location according to the first request, then perform data synchronization operation, and perform data transmission in response to the DMA.

Alternatively, a first request that conforms to the first transmission protocol required for data transmission by the data response device may, but is not limited to, be constructed. The first request may, but is not limited to, be configured to indicate the target location. After receiving the first request, the data response device performs data synchronization operation on the data at the target location, and then performs data transmission operation after completing the synchronization operation.

In this embodiment, for the same data, the storage location in the second storage space and the storage location in the first storage space may, but is not limited to, have a corresponding relationship. The location of the data that the target request device needs to transmit in the second storage space may, but is not limited to, be determined as the target location.

In this embodiment, in the case where the data response device receives the first request, data synchronization may, but is not limited to, be performed on the data at the target location in the first storage space in various manners, for example, data synchronization is performed on the data at the target location in the first storage space by using corresponding data in the second storage space. Alternatively, data synchronization is performed on the data at the target location in the first storage space by obtaining data.

In this embodiment, the data response device and the data request device may, but is not limited to, be connected to each other through a bus of the first transmission protocol, for example, peripheral component interconnect express (PCIE). The data request device may, but is not limited to, send the first request to the data response device through the bus of the first transmission protocol, for example, the data request device sends the first request to the data response device through the PCIE.

In the technical solution provided in the above step S204, the second transmission protocol may, but is not limited to, be used to maintain data synchronization between the second storage space and the first storage space. For example, in the case where storage situations of the second storage space and the first storage space for the same data are different, correct data is used to perform data synchronization on wrong data, so that the storage situations of the second storage space and the first storage space for the same data are consistent.

In this embodiment, the above data transmission request may, but is not limited to, be configured to indicate the data response device to determine data synchronization situation between the second storage space and the first storage space through the first protocol information of the second transmission protocol. In the case where the data transmission request indicates the data on which the transmission operation is to be performed, the data response device may, but is not limited to, determine whether the data on which the transmission operation is to be performed in the first storage space is synchronized with the corresponding data in the second storage space.

In this embodiment, the data transmission request may, but is not limited to, be used to indicate the storage location of the data on which the transmission operation is to be performed. For example, the data transmission request carries the storage location of the data on which the transmission operation is to be performed. Alternatively, the data transmission request carries an identifier of the data on which the transmission operation is to be performed, and the storage location of the data on which the transmission operation is to be performed is determined according to a corresponding relationship between the identifier and the storage location.

In an exemplary embodiment, data synchronization may, but is not limited to, be performed on the second storage space and the first storage space according to the first protocol information of the second transmission protocol on the data response device in the following manners: querying a target storage state of the target data from a storage state of the second transmission protocol recorded on the data response device in response to target data of a storage location where the transmission operation is to be performed indicated by the data transmission request being stored in the second storage space, where the first protocol information includes the storage state, and the storage state is configured to indicate a synchronization state of data stored in the second storage space; and synchronizing the target data to the first storage space in response to the target storage state being a target state, where the target state is configured to indicate that the target data is modified but not synchronized.

In this embodiment, the data transmission request may, but is not limited to, be configured to indicate one or more data on which the transmission operation is to be performed. In the case where the data transmission request indicates a plurality of data on which the transmission operation is to be performed, each of the plurality of data on which the transmission operation is to be performed may, but is not limited to, be determined as target data, a storage state of each target data is queried from the storage state of the second transmission protocol recorded on the data response device, and a process of synchronizing the target data to the first storage space is performed only for data whose storage state is the target state.

In this embodiment, the second transmission protocol may, but is not limited to, be configured to obtain the storage state of each data stored in the second storage space. For example, the storage state of all data stored in the second storage space is obtained through the second transmission protocol, and then the target storage state of the target data is obtained by filtering from all the data. Alternatively, the target storage state of the target data may be directly obtained through the second transmission protocol.

In this embodiment, the target storage state of the target data stored in the second storage space may, but is not limited to, be obtained through the second transmission protocol. The target storage state of the target data may, but is not limited to, be configured to indicate whether the target data is modified. In the case where the target storage state indicates that the target data is modified, the target storage state may further, but is not limited to, be configured to indicate whether the modified target data is synchronized from the second storage space to the first storage space.

In this embodiment, the storage state of the data stored in the second storage space may include, but is not limited to, modified, modified and synchronized, modified but not synchronized, and the like. The target state may, but is not limited to, be configured to indicate that the corresponding data is modified but the modified data is not synchronized to the first storage space.

In an exemplary embodiment, the target storage state of the target data may, but is not limited to, be queried from the storage state of the second transmission protocol recorded on the data response device in the following manners: requesting to invoke the first protocol information of the second transmission protocol to the data response device; and querying the target storage state of the target data from the first protocol information of the second transmission protocol in response to the data response device allowing the first protocol information of the second transmission protocol to be invoked.

In this embodiment, in the case where the data request device sends a data transmission request through the first transmission protocol, the data response device may, but is not limited to, obtain the first protocol information through the second transmission protocol. Since the first transmission protocol and the second transmission protocol may, but are not limited to, be different protocols, the data request device may, but is not limited to, request the data response device to invoke the first protocol information of the second transmission protocol to obtain the target storage state of the target data.

In this embodiment, the storage state of the data stored in the second storage device may, but is not limited to, be stored in the first protocol information of the second transmission protocol. The data response device may, but is not limited to, obtain the target storage state of the target data by invoking the first protocol information of the second transmission protocol.

In an exemplary embodiment, the target data may, but is not limited to, be synchronized to the first storage space in the following manners: triggering a synchronization operation of the second transmission protocol for the target data in the second storage space; and converting the target state into a non-target state in response to the target data being synchronized to the first storage space, where the non-target state is configured to indicate that the target data has been synchronized.

In this embodiment, the second transmission protocol may, but is not limited to, be used to synchronize data in the second storage space to the first storage space. In the case where it is determined through the second transmission protocol that the target data in the second storage space has been modified and not synchronized to the first storage space, the target data may, but is not limited to, be synchronized to the first storage space through the second transmission protocol.

In this embodiment, the synchronization operation of the second transmission protocol may, but is not limited to, be triggered in various manners, for example, a request for triggering the synchronization operation of the second transmission protocol is sent to the second storage space. Alternatively, the data response device automatically triggers the synchronization operation of the second transmission protocol according to the target data.

In this embodiment, the synchronization operation of the second transmission protocol may, but is not limited to, be used to write the data in the second storage space to the first storage space, so as to realize the synchronization operation of the first storage space and the second storage space for the same data. In the case where the target data has been synchronized, the target state of the target data may, but is not limited to, be converted into a non-target state for indicating that the target data has been synchronized in the first storage space and the second storage space.

In this embodiment, the target data in the second storage space and the corresponding data in the first storage space may, but is not limited to, be stored in the form of cache line (Cacheline). In the case of different transmission operations, the synchronization operation of the second transmission protocol may, but is not limited to, be different, for example:

in the case where the transmission operation requests to perform a write operation on the target data in the second storage space, the write operation may, but is not limited to, be directly performed on the target data, and the target storage state of the target data may be converted into the non-target state for indicating that the target data has been synchronized;

alternatively, in the case where the transmission operation requests to perform a read operation on the target data in the second storage space, data synchronization operation may, but is not limited to, be performed on the target data and the target storage state of the target data is converted into the non-target state for indicating that the target data has been synchronized, and then the read operation is performed.

In an exemplary embodiment, the target storage state of the target data may, but is not limited to, be queried from the storage state of the second transmission protocol recorded on the data response device in the following manners: querying a target cache state label of the target data from a cache state label of a compute express link protocol recorded on the data response device, where the second transmission protocol includes the compute express link protocol, the storage state includes the cache state label, the first storage space is a memory space on the data response device, and the second storage space is a cache space on the data response device; and the target data may, but is not limited to, be synchronized to the first storage space in response to the target storage state being a target state in the following manners: triggering a cache consistency operation of the compute express link protocol for the target data in the cache space in response to the target cache state label being a modified label.

In this embodiment, in the case where the second transmission protocol is a compute express link (CXL) protocol, the cache state label may, but is not limited to, be obtained from a cache coherence protocol included in the CXL protocol. Taking the cache coherence protocol being MESI as an example, the cache state label may include, but is not limited to, modified (M), exclusive (E), shared(S) and invalid (I).

In this embodiment, taking the target cache state label being a MESI label as an example, in the case where the target storage state of the target data is M, the target storage state may, but is not limited to, be considered as a modified label, and cache consistency operation is performed on the target data in the storage space, that is, the target data is synchronized from the cache space to the memory space.

In this embodiment, the memory space of the data response device may, but is not limited to, be determined as the first storage space, the cache space of the data response device is determined as the second storage space, the second transmission protocol is the compute express link protocol, and the target state is modified. In the case where the target data on which the transmission operation is to be performed at the storage location indicated by the data transmission request is stored in the cache space, the target storage state of the target data is queried from the storage state of the compute express link protocol recorded on the data response device. In the case where the target storage state of the target data is the target state, the target data is synchronized to the memory space.

In an exemplary embodiment, data synchronization may, but is not limited to, be performed on the second storage space and the first storage space according to the first protocol information of the second transmission protocol on the data response device in the following manners: detecting transmission protocols supported by the data response device; selecting the second transmission protocol whose function conforms to storage types of the first storage space and the second storage space from the transmission protocols supported by the data response device; and performing data synchronization on the second storage space and the first storage space according to the first protocol information of the second transmission protocol.

In this embodiment, the data response device may, but is not limited to, support a plurality of transmission protocols, for example, a transmission control protocol (TCP), a user datagram protocol (UDP), a CXL protocol, and the like. The second transmission protocol may, but is not limited to, be configured to perform data synchronization between the first storage space and the second storage space. For example, taking the first storage space being a memory space and the second storage space being a cache space as examples, a protocol that may perform data synchronization between the memory space and the cache space may, but is not limited to, be selected as the second transmission protocol from transmission protocols supported by the data response device, for example, the CXL protocol.

In this embodiment, the second transmission protocol may include, but is not limited to, a plurality of protocol information. Taking the second transmission protocol being the CXL protocol as an example, Cacheline information included in the CXL protocol may include, but is not limited to, be determined as the first protocol information of the second transmission protocol, and the target storage state of the target data is queried from the Cacheline information included in the CXL protocol.

In an exemplary embodiment, data synchronization may, but is not limited to, be performed on the second storage space and the first storage space according to the first protocol information of the second transmission protocol on the data response device in the following manners: performing data synchronization on the data response device according to the first protocol information of the second transmission protocol on the data response device, and performing data synchronization on one or more protocol devices connected to the data response device through the second transmission protocol.

In this embodiment, the data response device may, but is not limited to, be connected to a plurality of protocol devices through the second transmission protocol. Taking the second transmission protocol being the CXL protocol as an example, devices connected to the data response device through the CXL protocol may include, but are not limited to: a CPU, a GPU, a field programmable gate array (FPGA), and the like.

In this embodiment, taking the second transmission protocol being the CXL protocol as an example, the data response device may further, but is not limited to, be connected to a plurality of devices for memory expansion and other operations. For example: the memory spaces of the connected devices is encoded together with the first storage space of the data response device as the first storage space of the data response device. In the case where data synchronization is performed by using the first protocol information of the second transmission protocol, the memory space of the data response device itself and the memory spaces of the devices connected to the data response device may, but is not limited to, be used as the first storage space, and data synchronization is performed by using the first protocol information.

In an exemplary embodiment, data synchronization may, but is not limited to, be performed on the data response device according to the first protocol information of the second transmission protocol on the data response device, and perform data synchronization on the one or more protocol devices connected to the data response device through the second transmission protocol in the following manners: performing data synchronization on the data response device according to first protocol information of the compute express link protocol on the data response device, and performing data synchronization on one or more compute express link devices connected to the data response device through the compute express link protocol.

In this embodiment, taking the second transmission protocol being the CXL protocol as an example, the data response device may, but is not limited to, be connected to a plurality of devices, that is, compute express link devices, through the CXL protocol, and encode the memory spaces of the connected compute express link devices together with the first storage space of the data response device by using the cache coherence protocol in the CXL protocol for use. In the case where data synchronization is performed by using the first protocol information of the second transmission protocol, the memory space of the data response device and the memory spaces of the compute express link devices connected to the data response device through the CXL protocol may both, but is not limited to, be used as the first storage space, and data synchronization is performed by using the first protocol information.

In an exemplary embodiment, there is provided an example of an execution process of data synchronization. FIG. 3 is a flowchart of an execution process of data synchronization according to an embodiment of the present disclosure. As shown in FIG. 3, taking a data request device sending a data transmission request of a DMA protocol to a data response device, the DMA protocol being a first transmission protocol, the data transmission request carrying a storage address of target data on which the transmission operation needs to be performed in the data response device in the first storage space, a target storage state of a Cacheline of the target data being detected by a MESI protocol in a CXL protocol, the data response device being connected to a plurality of CXL devices through the CXL protocol, and the second storage space including a cache space of the data response device and storage spaces of the CXL devices connected to the data response device through the CXL protocol as an example, data synchronization may, but is not limited to, be performed on the target data through the following processes:

- step S302, corresponding target data in the second storage space is determined according to the storage address of the target data in the first storage space;
- step S304, the target storage state of the cache line of the target data is detected;
- step S306, it is determined whether the target storage state is a M (modified) state;
- step S308, the target data in the second storage space is written back to the first storage space in response to the target storage state being the M state;
- step S310, the target storage state is modified to a E (exclusive) state in response to the target data being written back to the first storage space; and
- step S312, the data request device is notified that the target data synchronization has been completed after the target storage state is modified to the E state.

The data request device may, but is not limited to, request to perform a transmission operation on a plurality of data on the data response device through a data transmission request. In the case where the data request device requests to perform the transmission operation on the plurality of data on the data response device, the data response device may, but is not limited to, sequentially detect a target storage state of a cache line of each target data, and only perform a data synchronization operation on the target data with a storage state of M, thereby improving the efficiency of the data synchronization operation. Since the data response device not only has its own memory space and cache space, but also connected to one or more CXL devices through the CXL protocol, in the case where the data response device needs to perform data synchronization, the data response device not only needs to detect whether the cache line in its own cache space is in the M state, but also needs to detect whether the cache lines in the CXL devices connected through the CXL protocol are in the M state, and use the CXL protocol to write back data.

In the technical solution provided in the above step S206, the transmission operation may, but is not limited to, be performed on the first storage space in various situations. For example, in the case where data synchronization between the second storage space and the first storage space is completed, the data response device performs the transmission operation on the first storage space. Alternatively, in the case where data synchronization between the second storage space and the first storage space is completed, the data response device performs the transmission operation on the first storage space according to an instruction of the data request device.

In an exemplary embodiment, the transmission operation may, but is not limited to, be performed on the first storage space in the following manners: receiving a second request of the first transmission protocol sent by the data request device, where the second request is configured to request to perform the transmission operation on the data at the target location in the first storage space; and performing the transmission operation on the data at the target location in the first storage space in response to the second request.

In this embodiment, the data request device may, but is not limited to, send a second request of the first transmission protocol to the data response device as an instruction for the data response device to perform the transmission operation on the data at the target location of the first storage space.

In this embodiment, the data response device may, but is not limited to, perform the transmission operation on the data at the target location in the first storage space according to the second request sent by the data request device. Taking the first storage space being the memory space of the data response device as an example, the second request may, but is not limited to, be used to request access to the memory space of the data response device, for example, direct memory access (DMA).

Figure 4:
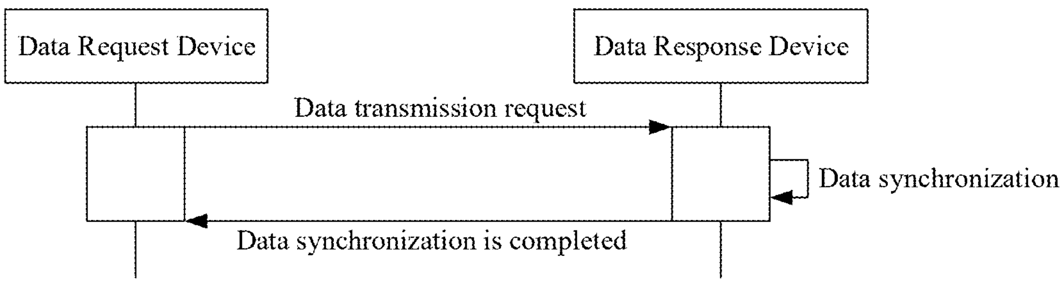
FIG. 4 is a schematic diagram of a transmission process of a data transmission request according to an embodiment of the present disclosure.

In an exemplary embodiment, there is provided an example of a transmission process of a data transmission request. FIG. 4 is a schematic diagram of the transmission process of a data transmission request according to an embodiment of the present disclosure. As shown in FIG. 4, taking the first storage space being the memory space and the second storage space being the cache space as an example, in the case where the data request device sends a data transmission request to the data response device, the data response device performs data synchronization between the cache space and the memory space by responding to the data transmission request, and then performs the data transmission operation after completing data synchronization between the cache space and the memory space.

The data transmission operation between the data request device and the data response device may include, but is not limited to, that the data request device requests to write data to the data response device, or that the data request device requests to read data stored in the data response device.

In an exemplary embodiment, there is provided an example of a data request device and a data response device. FIG. 5 is a schematic diagram of a data request device and a data response device according to an embodiment of the present disclosure. As shown in FIG. 5, the data request device and the data response device may, but is not limited to, be deployed with a DMA interface and a PCIE interface and support CXL related protocols (CXL. memory (memory protocol), CXL. cache (cache coherence protocol), CXL. IO), and the use and response of each protocol are performed by a synchronous optimization controller. In the process of performing data synchronization between the second storage space and the first storage space by the data response device, the data request device and the data response device may, but are not limited to, operate in the following manners.

In the case where the data response device receives the data transmission request, corresponding target data and the target storage state of the target data (namely, a Cacheline state) may, but is not limited to, be obtained from the cache space (namely, the second storage space) according to the address of the target data indicated in the data transmission request. Since a CXL Cacheline state contains consistent cache information, in the process of performing data synchronization between the second storage space and the first storage space by the data response device, the data response device may not write back and synchronize all the Cacheline involved in the data transmission request, for example:

The CXL Cacheline states E, S and I all indicate that cached data in the cache space and data in the memory space have been synchronized or are meaningless. These CXL Cacheline states do not require further data synchronization operations, and both the data request device and the data response device maintain the current CXL state. The data request device may, but is not limited to, transmit the target data from the memory space (that is, the first storage space) of the data response device through a DMA request.

For the CXL Cacheline state M, the M state may, but is not limited to, be used to indicate that the target data in the cache space is not synchronized with the memory space and is unknown to other devices connected to the data response device through the CXL protocol, and these CXL Cacheline states need to be processed, which may include, but is not limited to, the following two situations:

- if the transmission operation requested by the data request device is that the Cacheline is a written party, that is, data is written to the Cacheline, the data in the cache space may, but is not limited to, no longer be written back to the memory space, the data is directly written to the Cacheline through the DMA, and the current Cacheline state is changed to I; and
- if the transmission operation requested by the data request device is that the Cacheline corresponds to a read party, that is, the data is read from the current Cacheline, it is necessary to write the data in the Cacheline back to the memory space, the Cacheline state is changed to E, and then the data is read from the memory space using the DMA.

Since the DMA and the cache consistency process are combined, according to the state combination of the two functions, it is first determined which cache data needs to be written back, and only the cache consistency synchronization process that needs to be written back is triggered, instead of simply writing all the cache data requested by the DMA back to a main memory, and all the cache states related to the DMA request are set to I.

By adding the synchronous optimization controller, the DMA transmission process is coordinated according to the cache state in CXL cache coherence protocol, the DMA process is merged with the cache coherence protocol synchronization process, and the process is optimized to remove unnecessary data synchronization processes.

In this embodiment, there is further provided a data transmission method. FIG. 6 is a flowchart of another data transmission method according to an embodiment of the present disclosure. As shown in FIG. 6, the flowchart includes the following steps:

- step S602, a data transmission request of a first transmission protocol is sent to a data response device, where the data transmission request is configured to indicate that a transmission operation is to be performed on data in a first storage space of a data response device, and a second storage space is further deployed on the data response device, where the second storage space is configured to store partial data in the first storage space, and the data response device is configured to perform the transmission operation on the first storage space after performing data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and
- step S604, information returned by the data response device after performing the transmission operation on the first storage space is received.

Through the above steps, the data transmission request of the first transmission protocol sent by the data request device is received, where the data transmission request is configured to indicate that the transmission operation is to be performed on the data in the first storage space of the data response device, and the second storage space is further deployed on the data response device, where the second storage space is configured to store the partial data in the first storage space; data synchronization is performed on the second storage space and the first storage space according to first protocol information of the second transmission protocol on the data response device in response to the data transmission request, where the second transmission protocol is configured to maintain data synchronization between the second storage space and the first storage space, and the first protocol information is configured to indicate the data synchronization situation between the second storage space and the first storage space; and the transmission operation is performed on the first storage space. Since the first protocol information is configured to obtain the data synchronization situation between the second storage space and the first storage space, and the second transmission protocol is configured to maintain data synchronization between the second storage space and the first storage space, in the case where the data transmission request of the first transmission protocol is received, data synchronization is performed on the second storage space and the first storage space based on the first protocol information of the second transmission protocol on the data response device, and then the transmission operation is performed, the consistency of the data between the second storage space and the first storage space may be ensured. Therefore, the problem of relatively low efficiency in data transmission may be solved, and the effect of improving the efficiency of data transmission may be realized.

In this embodiment, the data transmission method proposed in the present disclosure may be applied in a wide range of scenarios, including but not limited to: file transmission, audio transmission, video transmission, data packet transmission, and the like. In following embodiments, the above data transmission method may be explained by taking a file transmission scenario as an example, but the usage scenario is not limited, and any scenario that requires data transmission may use the data transmission method proposed in the present disclosure. The scenarios used by the above data transmission method may include, but are not limited to, data response devices and data request devices, and different devices may, but are not limited to, be determined as the data response device and the data request device according to different usage scenarios.

In the technical solution provided in the above step S602, the above data transmission method may be applied to, but is not limited to, the data request device. The data request device may include, but is not limited to, a device capable of obtaining data in the first storage space in the data response device, for example, a graphics processing unit (GPU), a central processing unit (CPU), a network adapter, a storage controller, an audio device, a peripheral control device, and the like.

In this embodiment, the above data response device may include, but is not limited to, a device capable of receiving and responding to the data transmission request sent by data request device, for example, a graphics processing unit (GPU), a central processing unit (CPU), a network adapter, a storage controller, a peripheral control device, and the like.

In this embodiment, the first transmission protocol may be, but is not limited to, a protocol that can be recognized by the data response device. The data response device may, but is not limited to, determine data that the data request device needs to perform the transmission operation according to the data transmission request of the first transmission protocol. The transmission operation may include, but is not limited to: requesting, by the data request device, to read data in the data response device, requesting, by the data request device, to write data into the data response device, and the like.

In an exemplary embodiment, the data transmission request of the first transmission protocol may, but is not limited to, be sent to the data response device in the following manners: sending a first request of the first transmission protocol to the data response device, where the first request is configured to indicate the data response device to perform data synchronization on data at a target location in the first storage space, and the data transmission request includes the first request.

In this embodiment, the first transmission protocol may be, but is not limited to, a protocol that can be recognized by the data response device. The first request may, but is not limited to, be indicated in the first transmission protocol to enable the data response device to perform data synchronization operation on the data at the target location in the first storage space. For example, taking the first transmission protocol being direct memory access (DMA) as an example, the target location may, but is not limited to, be carried in the DMA, so that the data response device may perform data synchronization operation according to the target location and perform data transmission in response to the DMA.

Alternatively, the first request may, but is not limited to, be carried in the first transmission protocol to enable the data response device to perform data synchronization operation on the data at the target location in the first storage space. For example, taking the first transmission protocol being the DMA as an example, the first request may, but is not limited to, be carried in the DMA to enable the data response device to obtain the target location according to the first request, then perform data synchronization operation, and perform data transmission in response to the DMA.

Alternatively, a first request that conforms to the first transmission protocol required for data transmission by the data response device may, but is not limited to, be constructed. The first request may, but is not limited to, be configured to indicate the target location. After receiving the first request, the data response device performs data synchronization operation on the data at the target location, and then performs data transmission operation after completing the synchronization operation.

In this embodiment, the location of the data that the target request device needs to transmit in the second storage space may, but is not limited to, be determined as the target location. For the same data, the storage location in the second storage space and the storage location in the first storage space may, but is not limited to, have a corresponding relationship.

In an exemplary embodiment, the first request of the first transmission protocol may, but is not limited to, be sent to the data response device in the following manners: creating the first request carrying the target location; and sending the first request to the data response device through a bus of the first transmission protocol connected to the data response device.

In this embodiment, a bus of the first transmission protocol may, but is not limited to, be configured to connect the data response device and the data request device, for example, peripheral component interconnect express (PCIE). The data request device may, but is not limited to, send the first request to the data response device through the bus of the first transmission protocol, for example, the data request device sends the first request to the data response device through the PCIE.

In an exemplary embodiment, the first request may, but is not limited to, be sent to the data response device through the bus of the first transmission protocol connected to the data response device in the following manners: broadcasting the first request to the data response device and one or more protocol devices connected to the data response device through the second transmission protocol through the bus of the first transmission protocol connected to the data response device, where the data response device and the one or more protocol devices are configured to perform data synchronization on the data at the target location in response to the first request.

In this embodiment, the data response device may, but is not limited to, be connected to a plurality of protocol devices through the second transmission protocol. Taking the second transmission protocol being the CXL protocol as an example, devices connected to the data response device through the CXL protocol may include, but are not limited to: a CPU, a GPU, a field programmable gate array (FPGA), and the like.

In this embodiment, taking the second transmission protocol being the CXL protocol as an example, the data response device may further, but is not limited to, be connected to a plurality of devices for memory expansion and other operations. For example: the memory space of the connected devices is encoded together with the first storage space of the data response device as the first storage space of the data response device. In the case where data synchronization is performed by using the first protocol information of the second transmission protocol, the memory space of the data response device itself and the memory space of the devices connected to the data response device may, but is not limited to, be used as the first storage space, and data synchronization is performed by using the first protocol information.

In this embodiment, a data transmission device may, but is not limited to, transmit the first request to the data response device and one or more protocol devices connected to the data response device, so that both the data response device and the protocol devices connected to the data response device may receive and respond the first request.

In an exemplary embodiment, before sending the second request of the first transmission protocol to the data response device, data synchronization may, but is not limited to, be performed in the following manners: performing data synchronization on a third storage space and a fourth storage space in response to the transmission operation including a data write operation, where the third storage space is configured to store data on which the data write operation is performed, and the fourth storage space is configured to store partial data in the third storage space.

In this embodiment, the data request device may, but is not limited to, deploy a plurality of storage spaces, for example, cache spaces and memory spaces. The fourth storage space is configured to store partial data in the third storage space. The cache space of the data request device may, but is not limited to, be determined as the fourth storage space and the memory space of the data request device is determined as the third storage space.

In this embodiment, in the case where the data request device requests to write data to the data response device, the consistency of a plurality of storage spaces deployed in the data request device may, but is not limited to, be maintained. For example, the latest data stored in the third storage space is written into the fourth storage space. Alternatively, the latest data written in the fourth storage space is stored in the third storage space.

In an exemplary embodiment, data synchronization may, but is not limited to, be performed on the third storage space and the fourth storage space in the following manners: obtaining second protocol information of the second transmission protocol in response to the data on which the data write operation is performed being stored in the fourth storage space, where the second protocol information is configured to indicate a data synchronization situation between the third storage space and the fourth storage space; and performing data synchronization on the third storage space and the fourth storage space according to the second protocol information.

In this embodiment, whether data in the third storage space is consistent with data in the fourth storage space may, but is not limited to, be determined through the second protocol information of the second transmission protocol. Taking the second transmission protocol being a CXL protocol as an example, the second protocol information may include, but is not limited to, modified (M), exclusive (E), shared(S) and invalid (I). In the case where the second protocol information is M, data synchronization may, but is not limited to, be performed on the third storage space and the fourth storage space.

In the technical solution provided in the above step S604, in the case where the data response device completes data synchronization, an instruction of completing data synchronization may, but is not limited to, be returned to the data transmission device. In the case where the data response device completes data transmission operation, an instruction of completing data transmission may further, but is not limited to, be returned to the data transmission device, and the data response device may, but is not limited to, be configured to complete data synchronization and data transmission operation according to the same instruction, and return information returned after performing data transmission operation.

Alternatively, the data response device may further, but is not limited to, return the information of completing data synchronization to the data request device in response to data synchronization being completed, and then return the information of completing data transmission to the data request device in response to data transmission being completed.

In this embodiment, the operation performed by the data response device on the first storage space may include, but is not limited to, transmitting data in the first storage space to the data request device. The data is written to the first storage space according to the instruction of the data request device.

In an exemplary embodiment, the information returned by the data response device after performing the transmission operation on the first storage space may, but is not limited to, be received in the following manners: sending a second request of the first transmission protocol to the data response device, where the second request is configured to request to perform the transmission operation on data at a target location in the first storage space; and receiving the information returned by the data response device in response to the second request.

In this embodiment, the data request device may, but is not limited to, send a second request of the first transmission protocol to the data response device as an instruction for the data response device to perform the transmission operation on the data at the target location of the first storage space.

In this embodiment, the data response device may, but is not limited to, perform the transmission operation on the data at the target location in the first storage space according to the second request sent by the data request device. Taking the first storage space being the memory space of the data response device as an example, the second request may, but is not limited to, be used to request access to the memory space of the data response device, for example, direct memory access (DMA).

In an exemplary embodiment, there is provided an example of a process of data transmission between a data request device and a data response device. FIG. 7 is a schematic diagram of a process of data transmission between a data request device and a data response device according to an embodiment of the present disclosure. As shown in FIG. 7, the data request device creates a data transmission request of a first transmission protocol, and the data processing request is used to indicate the data request device to request target data for data transmission to the data response device. Since the data response device is connected to one or more devices (namely CXL devices) through CXL protocol, the data response device broadcasts a data transmission request to the data response device and the devices connected to the data response device through a PCIE bus, and the data response device and the devices connected to the data response device perform data synchronization operation according to the target data indicated in the data transmission request. In the case where the data response device and the devices connected to the data response device complete data synchronization operation, the data request device may, but is not limited to, send a DMA request to the data response device again for transmitting the target data from the first storage space of the data response device. In the case where the transmission of the target data is completed, the data response device may, but is not limited to, return an indication of completion to the data request device.

From descriptions of the above embodiments, a person skilled in the art may clearly understand that the method according to the foregoing embodiments may be implemented in a manner of combining software and a necessary general hardware platform, and of course, may also be implemented by hardware, but in many cases the former is a better embodiment. Based on such an understanding, the technical solutions of the present disclosure substantially or parts making contributions to the conventional art may be embodied in form of a software product, which is stored in a non-transitory readable storage medium (for example, a ROM/RAM, a magnetic disk and an optical disk), and includes a plurality of instructions configured to enable a terminal device (which may be a mobile phone, a computer, a server, a network device, or the like) to execute the method in each embodiment of the present disclosure.

In this embodiment, there is further provided a data transmission system. The system is configured to implement the above embodiments and the preferred embodiments, and those that have already been described will not be repeated.

Figure 8:
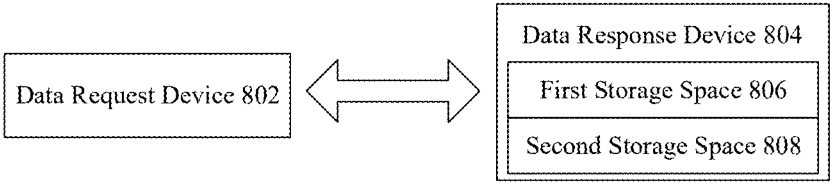
FIG. 8 is a structural block diagram of a data transmission system according to an embodiment of the present disclosure.

FIG. 8 is a structural block diagram of a data transmission system according to an embodiment of the present disclosure. As shown in FIG. 8, the system includes a data request device 802 and a data response device 804, where a first storage space 806 and a second storage space 808 are deployed on the data response device, both the data request device and the data response device support a first transmission protocol, and the data response device further supports a second transmission protocol, where the second transmission protocol is configured to maintain data synchronization between the second storage space and the first storage space; the data request device is configured to perform corresponding steps in any one of the above method embodiments; and the data response device is configured to perform corresponding steps in any one of the above method embodiments.

Through the above system, the data transmission request of the first transmission protocol sent by the data request device is received, where the data transmission request is configured to indicate that the transmission operation is to be performed on the data in the first storage space of the data response device, and the second storage space is further deployed on the data response device, where the second storage space is configured to store the partial data in the first storage space; data synchronization is performed on the second storage space and the first storage space according to first protocol information of the second transmission protocol on the data response device in response to the data transmission request, where the second transmission protocol is configured to maintain data synchronization between the second storage space and the first storage space, and the first protocol information is configured to indicate the data synchronization situation between the second storage space and the first storage space; and the transmission operation is performed on the first storage space. Since the first protocol information is configured to obtain the data synchronization situation between the second storage space and the first storage space, and the second transmission protocol is configured to maintain data synchronization between the second storage space and the first storage space, in the case where the data transmission request of the first transmission protocol is received, data synchronization is performed on the second storage space and the first storage space based on the first protocol information of the second transmission protocol on the data response device, and then the transmission operation is performed, the consistency of the data between the second storage space and the first storage space may be ensured. Therefore, the problem of relatively low efficiency in data transmission may be solved, and the effect of improving the efficiency of data transmission may be realized.

In an exemplary embodiment, the above data request device may, but is not limited to, be configured to: send a data transmission request of a first transmission protocol to a data response device, where the data transmission request is configured to indicate that a transmission operation is to be performed on data in a first storage space of a data response device, and a second storage space is further deployed on the data response device, where the second storage space is configured to store partial data in the first storage space, and the data response device is configured to perform the transmission operation on the first storage space after performing data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and receive information returned by the data response device after performing the transmission operation on the first storage space.

In an exemplary embodiment, the above data request device may, but is not limited to, send the data transmission request of the first transmission protocol to the data response device in the following manners: sending a first request of the first transmission protocol to the data response device, where the first request is configured to indicate the data response device to perform data synchronization on data at a target location in the first storage space, and the data transmission request includes the first request.

In an exemplary embodiment, the data request device may, but is not limited to, send the first request of the first transmission protocol to the data response device in the following manners: creating the first request carrying the target location; and sending the first request to the data response device through a bus of the first transmission protocol connected to the data response device.

In an exemplary embodiment, the above data request device may, but is not limited to, send the first request to the data response device through the bus of the first transmission protocol connected to the data response device in the following manners: broadcasting the first request to the data response device and one or more protocol devices connected to the data response device through the second transmission protocol through the bus of the first transmission protocol connected to the data response device, where the data response device and the one or more protocol devices are configured to perform data synchronization on the data at the target location in response to the first request.

In an exemplary embodiment, the data request device may, but is not limited to, receive the information returned by the data response device after performing the transmission operation on the first storage space in the following manners: sending a second request of the first transmission protocol to the data response device, where the second request is configured to request to perform the transmission operation on data at a target location in the first storage space; and receiving the information returned by the data response device in response to the second request.

In an exemplary embodiment, before sending the second request of the first transmission protocol to the data response device, the above data request device may, but is not limited to, perform data synchronization in the following manners: performing data synchronization on a third storage space and a fourth storage space in response to the transmission operation including a data write operation, where the third storage space is configured to store data on which the data write operation is performed, and the fourth storage space is configured to store partial data in the third storage space.

In an exemplary embodiment, the above data request device may, but is not limited to, perform data synchronization on the third storage space and the fourth storage space in the following manners: obtaining second protocol information of the second transmission protocol in response to the data on which the data write operation is performed being stored in the fourth storage space, where the second protocol information is configured to indicate a data synchronization situation between the third storage space and the fourth storage space; and performing data synchronization on the third storage space and the fourth storage space according to the second protocol information.

In an exemplary embodiment, the above data response device may, but is not limited to, be further configured to: receive the data transmission request of the first transmission protocol sent by the data request device, where the data transmission request is configured to indicate that the transmission operation is to be performed on the data in the first storage space of the data response device, and the second storage space is further deployed on the data response device, where the second storage space is configured to store the partial data in the first storage space; perform data synchronization on the second storage space and the first storage space according to first protocol information of the second transmission protocol on the data response device in response to the data transmission request, where the second transmission protocol is configured to maintain data synchronization between the second storage space and the first storage space, and the first protocol information is configured to indicate the data synchronization situation between the second storage space and the first storage space; and perform the transmission operation on the first storage space.

In an exemplary embodiment, the above data response device may, but is not limited to, perform data synchronization on the second storage space and the first storage space according to the first protocol information of the second transmission protocol on the data response device in the following manners: querying a target storage state of the target data from a storage state of the second transmission protocol recorded on the data response device in response to target data of a storage location where the transmission operation is to be performed indicated by the data transmission request being stored in the second storage space, where the first protocol information includes the storage state, and the storage state is configured to indicate a synchronization state of data stored in the second storage space; and synchronizing the target data to the first storage space in response to the target storage state being a target state, where the target state is configured to indicate that the target data is modified but not synchronized.

In an exemplary embodiment, the above data response device may, but is not limited to, query the target storage state of the target data from the storage state of the second transmission protocol recorded on the data response device in the following manners: requesting to invoke the first protocol information of the second transmission protocol to the data response device; and querying the target storage state of the target data from the first protocol information of the second transmission protocol in response to the data response device allowing the first protocol information of the second transmission protocol to be invoked.

In an exemplary embodiment, the above data response device may, but is not limited to, synchronize the target data to the first storage space in the following manners: triggering a synchronization operation of the second transmission protocol for the target data in the second storage space; and converting the target state into a non-target state in response to the target data being synchronized to the first storage space, where the non-target state is configured to indicate that the target data has been synchronized.

In an exemplary embodiment, the above data response device may, but is not limited to, query the target storage state of the target data from the storage state of the second transmission protocol recorded on the data response device in the following manners: querying a target cache state label of the target data from a cache state label of a compute express link protocol recorded on the data response device, where the second transmission protocol includes the compute express link protocol, the storage state includes the cache state label, the first storage space is a memory space on the data response device, and the second storage space is a cache space on the data response device; and the target data may, but is not limited to, be synchronized to the first storage space in response to the target storage state being a target state in the following manners: triggering a cache consistency operation of the compute express link protocol for the target data in the cache space in response to the target cache state label being a modified label.

In an exemplary embodiment, the above data response device may, but is not limited to, perform data synchronization on the second storage space and the first storage space according to the first protocol information of the second transmission protocol on the data response device in the following manners: detecting transmission protocols supported by the data response device; selecting the second transmission protocol whose function conforms to storage types of the first storage space and the second storage space from the transmission protocols supported by the data response device; and performing data synchronization on the second storage space and the first storage space according to the first protocol information of the second transmission protocol.

In an exemplary embodiment, the above data response device may, but is not limited to, perform data synchronization on the second storage space and the first storage space according to the first protocol information of the second transmission protocol on the data response device in the following manners: performing data synchronization on the data response device according to the first protocol information of the second transmission protocol on the data response device, and performing data synchronization on one or more protocol devices connected to the data response device through the second transmission protocol.

In an exemplary embodiment, the above data response device may, but is not limited to, perform data synchronization on the data response device according to the first protocol information of the second transmission protocol on the data response device, and perform data synchronization on the one or more protocol devices connected to the data response device through the second transmission protocol in the following manners: performing data synchronization on the data response device according to first protocol information of the compute express link protocol on the data response device, and performing data synchronization on one or more compute express link devices connected to the data response device through the compute express link protocol.

In an exemplary embodiment, the above data response device may, but is not limited to, receive the data transmission request of the first transmission protocol sent by the data request device in the following manners: receiving a first request of the first transmission protocol sent by the data request device, where the first request is configured to indicate the data response device to perform data synchronization on data at a target location in the first storage space, and the data transmission request includes the first request.

In an exemplary embodiment, the above data response device may, but is not limited to, perform the transmission operation on the first storage space in the following manners: receiving a second request of the first transmission protocol sent by the data request device, where the second request is configured to request to perform the transmission operation on the data at the target location in the first storage space; and performing the transmission operation on the data at the target location in the first storage space in response to the second request.

In this embodiment, there is further provided a data transmission apparatus. The apparatus is configured to implement the above embodiments and the preferred embodiments, and those that have already been described will not be repeated. As used below, the term "module" may be a combination of software and/or hardware that implements a predetermined function. Although the apparatus described in the following embodiments is implemented in software, but implementations in hardware, or a combination of software and hardware, are also possible and conceived.

Figure 9:
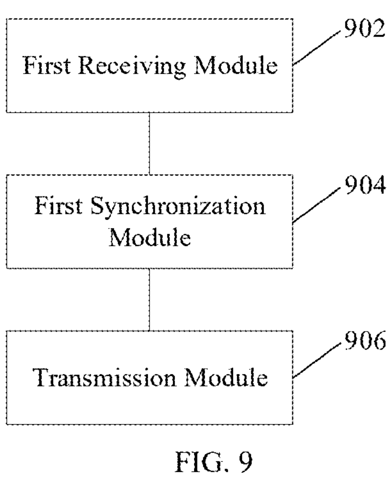
FIG. 9 is a structural block diagram of a data transmission apparatus according to an embodiment of the present disclosure.

FIG. 9 is a structural block diagram of a data transmission apparatus according to an embodiment of the present disclosure. As shown in FIG. 9, the apparatus includes:

- a first receiving module 902 configured to receive a data transmission request of a first transmission protocol sent by a data request device, where the data transmission request is configured to indicate that a transmission operation is to be performed on data in a first storage space of a data response device, and a second storage space is further deployed on the data response device, where the second storage space is configured to store partial data in the first storage space;
- a first synchronization module 904 configured to perform data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and
- a transmission module 906 configured to perform the transmission operation on the first storage space.

Through the above apparatus, the data transmission request of the first transmission protocol sent by the data request device is received, where the data transmission request is configured to indicate that the transmission operation is to be performed on the data in the first storage space of the data response device, and the second storage space is further deployed on the data response device, where the second storage space is configured to store the partial data in the first storage space; data synchronization is performed on the second storage space and the first storage space according to first protocol information of the second transmission protocol on the data response device in response to the data transmission request, where the second transmission protocol is configured to maintain data synchronization between the second storage space and the first storage space, and the first protocol information is configured to indicate the data synchronization situation between the second storage space and the first storage space; and the transmission operation is performed on the first storage space. Since the first protocol information is configured to obtain the data synchronization situation between the second storage space and the first storage space, and the second transmission protocol is configured to maintain data synchronization between the second storage space and the first storage space, in the case where the data transmission request of the first transmission protocol is received, data synchronization is performed on the second storage space and the first storage space based on the first protocol information of the second transmission protocol on the data response device, and then the transmission operation is performed, the consistency of the data between the second storage space and the first storage space may be ensured. Therefore, the problem of relatively low efficiency in data transmission may be solved, and the effect of improving the efficiency of data transmission may be realized.

In an exemplary embodiment, the first synchronization module includes:

- a query unit configured to query a target storage state of the target data from a storage state of the second transmission protocol recorded on the data response device in response to target data of a storage location where the transmission operation is to be performed indicated by the data transmission request being stored in the second storage space, where the first protocol information includes the storage state, and the storage state is configured to indicate a synchronization state of data stored in the second storage space;
- a first synchronization unit configured to synchronize the target data to the first storage space in response to the target storage state being a target state, where the target state is configured to indicate that the target data is modified but not synchronized.

In an exemplary embodiment, the query unit is further configured to request to invoke the first protocol information of the second transmission protocol to the data response device; and query the target storage state of the target data from the first protocol information of the second transmission protocol in response to the data response device allowing the first protocol information of the second transmission protocol to be invoked.

In an exemplary embodiment, the first synchronization unit is further configured to trigger a synchronization operation of the second transmission protocol for the target data in the second storage space; and convert the target state into a non-target state in response to the target data being synchronized to the first storage space, where the non-target state is configured to indicate that the target data has been synchronized.

In an exemplary embodiment, the first synchronization module is further configured to query a target cache state label of the target data from a cache state label of a compute express link protocol recorded on the data response device, where the second transmission protocol includes the compute express link protocol, the storage state includes the cache state label, the first storage space is a memory space on the data response device, and the second storage space is a cache space on the data response device; and the synchronizing the target data to the first storage space in response to the target storage state being a target state includes: triggering a cache consistency operation of the compute express link protocol for the target data in the cache space in response to the target cache state label being a modified label.

In an exemplary embodiment, the first synchronization module includes:

- a detection unit configured to detect transmission protocols supported by the data response device;
- a selection unit configured to select the second transmission protocol whose function conforms to storage types of the first storage space and the second storage space from the transmission protocols supported by the data response device;
- a second synchronization unit configured to perform data synchronization on the second storage space and the first storage space according to the first protocol information of the second transmission protocol.

In an exemplary embodiment, the first synchronization module includes:

a third synchronization unit configured to perform data synchronization on the data response device according to the first protocol information of the second transmission protocol on the data response device, and perform data synchronization on one or more protocol devices connected to the data response device through the second transmission protocol.

In an exemplary embodiment, the third synchronization unit is further configured to perform data synchronization on the data response device according to first protocol information of the compute express link protocol on the data response device, and perform data synchronization on one or more compute express link devices connected to the data response device through the compute express link protocol.

In an exemplary embodiment, the first receiving module includes:

a first receiving unit configured to receive a first request of the first transmission protocol sent by the data request device, where the first request is configured to indicate the data response device to perform data synchronization on data at a target location in the first storage space, and the data transmission request includes the first request.

In an exemplary embodiment, the transmission module includes:

a second receiving unit configured to receive a second request of the first transmission protocol sent by the data request device, where the second request is configured to request to perform the transmission operation on the data at the target location in the first storage space;

a transmission unit configured to perform the transmission operation on the data at the target location in the first storage space in response to the second request.

Figure 10:
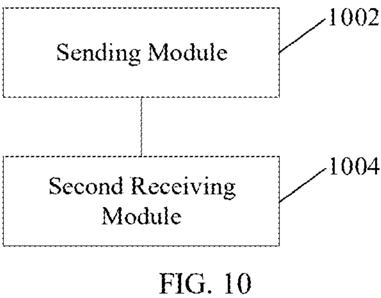
FIG. 10 is a structural block diagram of a data transmission apparatus according to an embodiment of the present disclosure.

In this embodiment, there is further provided a data transmission apparatus. The apparatus is configured to implement the above embodiments and the preferred embodiments, and those that have already been described will not be repeated. FIG. 10 is a structural block diagram of a data transmission apparatus according to an embodiment of the present disclosure. As shown in FIG. 10, the apparatus includes:

a sending module 1002 configured to send a data transmission request of a first transmission protocol to a data response device, where the data transmission request is configured to indicate that a transmission operation is to be performed on data in a first storage space of a data response device, and a second storage space is further deployed on the data response device, where the second storage space is configured to store partial data in the first storage space, and the data response device is configured to perform the transmission operation on the first storage space after performing data synchronization on the second storage space and the first storage space according to first protocol information of a second transmission protocol on the data response device in response to the data transmission request, where the second transmission protocol is configured to maintain data synchronization between the second storage space and the first storage space, and the first protocol information is configured to indicate a data synchronization situation between the second storage space and the first storage space; and a second receiving module 1004 configured to receive information returned by the data response device after performing the transmission operation on the first storage space.

Through the above apparatus, the data transmission request of the first transmission protocol sent by the data request device is received, where the data transmission request is configured to indicate that the transmission operation is to be performed on the data in the first storage space of the data response device, and the second storage space is further deployed on the data response device, where the second storage space is configured to store the partial data in the first storage space; data synchronization is performed on the second storage space and the first storage space according to first protocol information of the second transmission protocol on the data response device in response to the data transmission request, where the second transmission protocol is configured to maintain data synchronization between the second storage space and the first storage space, and the first protocol information is configured to indicate the data synchronization situation between the second storage space and the first storage space; and the transmission operation is performed on the first storage space. Since the first protocol information is configured to obtain the data synchronization situation between the second storage space and the first storage space, and the second transmission protocol is configured to maintain data synchronization between the second storage space and the first storage space, in the case where the data transmission request of the first transmission protocol is received, data synchronization is performed on the second storage space and the first storage space based on the first protocol information of the second transmission protocol on the data response device, and then the transmission operation is performed, the consistency of the data between the second storage space and the first storage space may be ensured. Therefore, the problem of relatively low efficiency in data transmission may be solved, and the effect of improving the efficiency of data transmission may be realized.

In an exemplary embodiment, the sending module includes:

a first sending unit configured to send a first request of the first transmission protocol to the data response device, where the first request is configured to indicate the data response device to perform data synchronization on data at a target location in the first storage space, and the data transmission request includes the first request.

In an exemplary embodiment, the first sending unit is further configured to create the first request carrying the target location; and send the first request to the data response device through a bus of the first transmission protocol connected to the data response device.

In an exemplary embodiment, the first sending unit is further configured to broadcast the first request to the data response device and one or more protocol devices connected to the data response device through the second transmission protocol through the bus of the first transmission protocol connected to the data response device, where the data response device and the one or more protocol devices are configured to perform data synchronization on the data at the target location in response to the first request.

In an exemplary embodiment, the second receiving module includes:

a second sending unit configured to send a second request of the first transmission protocol to the data response device, where the second request is configured to request to perform the transmission operation on data at a target location in the first storage space; and a third receiving unit configured to receive the information returned by the data response device in response to the second request.

In an exemplary embodiment, the apparatus further includes:

a second synchronization module configured to perform data synchronization on a third storage space and a fourth storage space in response to the transmission operation including a data write operation, where the third storage space is configured to store data on which the data write operation is performed, and the fourth storage space is configured to store partial data in the third storage space.

In an exemplary embodiment, the second synchronization module includes:

an obtaining unit configured to obtain second protocol information of the second transmission protocol in response to the data on which the data write operation is performed being stored in the fourth storage space, where the second protocol information is configured to indicate a data synchronization situation between the third storage space and the fourth storage space; and a fourth synchronization unit configured to perform data synchronization on the third storage space and the fourth storage space according to the second protocol information.

It should be noted that the above modules may be implemented through software or hardware, and the latter may, but is not limited to, be implemented in the following manners: the above modules are all located in the same processor; alternatively, the above modules are located in different processors in any combination.

An embodiment of the present disclosure further provides a non-transitory readable storage medium. The non-transitory readable storage medium stores a computer program, where the computer program, when executed by a processor, causes the processor to perform steps in any one of the above method embodiments.

In an exemplary embodiment, the above non-transitory readable storage medium may include, but is not limited to, various media that may store computer programs, for example, a USB flash disk, a read-only memory (ROM), a random access memory (RAM), a mobile hard disk drive, a magnetic disk, or an optical disk.

Figure 11:
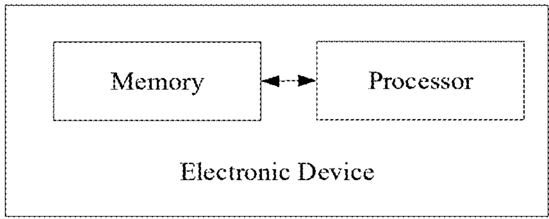
FIG. 11 is a structural block diagram of an electronic device according to an embodiment of the present disclosure.

An embodiment of the present disclosure further provides an electronic device. FIG. 11 is a structural block diagram of an electronic device according to an embodiment of the present disclosure. As shown in FIG. 11, the electronic device includes a memory and a processor. The memory stores a computer program, where the computer program, when executed by the processor, causes the processor to perform steps in any one of the above method embodiments.

In some embodiments of the present disclosure, the above electronic device may further include a transmission device and an input/output device, where the transmission device is connected to the above processor, and the input/output device is connected to the above processor.

Examples in this embodiment may refer to the examples described in the above embodiments and exemplary implementations, and this embodiment will not be repeated here.

It is apparent that a person skilled in the art should understand that the above modules or steps of the present disclosure may be realized by a general computing device and may also be gathered together on a single computing device or distributed in a network composed of multiple computing devices. The above modules or steps of the present disclosure may be implemented with program codes executable by the computing device, so that may be stored in a storage device for execution by the computing device, and in some cases, the steps shown or described may be performed in a different sequence than herein, or may be fabricated into individual integrated circuit modules respectively, or multiple modules or steps thereof are fabricated into a single integrated circuit module for implementation. In this way, the present disclosure is not limited to any specific combination of hardware and software.

The above are only preferred embodiments of the present disclosure and are not intended to limit the present disclosure. For a person skilled in the art, the present disclosure may have various modifications and variations. Any modifications, equivalent replacements, improvements and the like made within the principles of the present disclosure shall fall within the scope of protection of the present disclosure.

The invention claimed is:

1. A data transmission method, comprising:

receiving a data transmission request of a first transmission protocol sent by a data request device, wherein the data transmission request is configured to indicate that a transmission operation is to be performed on data in a first storage space of a data response device, and a second storage space is further deployed on the data response device, wherein the second storage space is configured to store partial data in the first storage space;

performing data synchronization on the second storage space and the first storage space according to first protocol information of a second transmission protocol on the data response device in response to the data transmission request, wherein the second transmission protocol is configured to maintain data synchronization between the second storage space and the first storage space, and the first protocol information is configured to indicate a data synchronization situation between the second storage space and the first storage space; and performing the transmission operation on the first storage space, wherein the performing data synchronization on the second storage space and the first storage space according to the first protocol information of the second transmission protocol on the data response device comprises: querying a target storage state of the target data from a storage state of the second transmission protocol recorded on the data response device in response to target data of a storage location where the transmission operation is to be performed indicated by the data transmission request being stored in the second storage space, wherein the first protocol information comprises the storage state, and the storage state is configured to indicate a synchronization state of data stored in the second storage space; and synchronizing the target data to the first storage space in response to the target storage state being a target state, wherein the target state is configured to indicate that the target data is modified but not synchronized.

2. The method according to claim 1, wherein the querying the target storage state of the target data from the storage state of the second transmission protocol recorded on the data response device comprises:

requesting to invoke the first protocol information of the second transmission protocol to the data response device; and querying the target storage state of the target data from the first protocol information of the second transmission protocol in response to the data response device allowing the first protocol information of the second transmission protocol to be invoked.

3. The method according to claim 1, wherein the synchronizing the target data to the first storage space comprises:

triggering a synchronization operation of the second transmission protocol for the target data in the second storage space; and converting the target state into a non-target state in response to the target data being synchronized to the first storage space, wherein the non-target state is configured to indicate that the target data has been synchronized.

4. The method according to claim 1, wherein the querying the target storage state of the target data from the storage state of the second transmission protocol recorded on the data response device comprises:

querying a target cache state label of the target data from a cache state label of a compute express link protocol recorded on the data response device, wherein the second transmission protocol comprises the compute express link protocol, the storage state comprises the cache state label, the first storage space is a memory space on the data response device, and the second storage space is a cache space on the data response device; and the synchronizing the target data to the first storage space in response to the target storage state being a target state comprises:

triggering a cache consistency operation of the compute express link protocol for the target data in the cache space in response to the target cache state label being a modified label.

5. The method according to claim 1, wherein the performing data synchronization on the second storage space and the first storage space according to the first protocol information of the second transmission protocol on the data response device comprises:

detecting transmission protocols supported by the data response device;

selecting the second transmission protocol whose function conforms to storage types of the first storage space and the second storage space from the transmission protocols supported by the data response device; and performing data synchronization on the second storage space and the first storage space according to the first protocol information of the second transmission protocol.

6. The method according to claim 1, wherein the performing data synchronization on the second storage space and the first storage space according to the first protocol information of the second transmission protocol on the data response device comprises:

performing data synchronization on the data response device according to the first protocol information of the second transmission protocol on the data response device, and performing data synchronization on one or more protocol devices connected to the data response device through the second transmission protocol.

7. The method according to claim 6, wherein the performing data synchronization on the data response device according to the first protocol information of the second transmission protocol on the data response device, and performing data synchronization on the one or more protocol devices connected to the data response device through the second transmission protocol comprises:

performing data synchronization on the data response device according to first protocol information of the compute express link protocol on the data response device, and performing data synchronization on one or more compute express link devices connected to the data response device through the compute express link protocol.

8. The method according to claim 1, wherein the receiving the data transmission request of the first transmission protocol sent by the data request device comprises:

receiving a first request of the first transmission protocol sent by the data request device, wherein the first request is configured to indicate the data response device to perform data synchronization on data at a target location in the first storage space, and the data transmission request comprises the first request.

9. The method according to claim 8, wherein the performing the transmission operation on the first storage space comprises:

receiving a second request of the first transmission protocol sent by the data request device, wherein the second request is configured to request to perform the transmission operation on the data at the target location in the first storage space; and performing the transmission operation on the data at the target location in the first storage space in response to the second request.

10. A data transmission method, comprising:

sending a data transmission request of a first transmission protocol to a data response device, wherein the data transmission request is configured to indicate that a transmission operation is to be performed on data in a first storage space of a data response device, and a second storage space is further deployed on the data response device, wherein the second storage space is configured to store partial data in the first storage space, and the data response device is configured to perform the transmission operation on the first storage space after performing data synchronization on the second storage space and the first storage space according to first protocol information of a second transmission protocol on the data response device in response to the data transmission request, wherein the second transmission protocol is configured to maintain data synchronization between the second storage space and the first storage space, and the first protocol information is configured to indicate a data synchronization situation between the second storage space and the first storage space, and the data response device is further configured to query a target storage state of the target data from a storage state of the second transmission protocol recorded on the data response device in response to target data of a storage location where the transmission operation is to be performed indicated by the data transmission request being stored in the second storage space, wherein the first protocol information comprises the storage state, and the storage state is configured to indicate a synchronization state of data stored in the second storage space; and synchronize the target data to the first storage space in response to the target storage state being a target state, wherein the target state is configured to indicate that the target data is modified but not synchronized; and receiving information returned by the data response device after performing the transmission operation on the first storage space.

11. The method according to claim 10, wherein the sending the data transmission request of the first transmission protocol to the data response device comprises:

sending a first request of the first transmission protocol to the data response device, wherein the first request is configured to indicate the data response device to perform data synchronization on data at a target location in the first storage space, and the data transmission request comprises the first request.

12. The method according to claim 11, wherein the sending the first request of the first transmission protocol to the data response device comprises:

creating the first request carrying the target location; and sending the first request to the data response device through a bus of the first transmission protocol connected to the data response device.

13. The method according to claim 12, wherein the sending the first request to the data response device through the bus of the first transmission protocol connected to the data response device comprises:

broadcasting the first request to the data response device and one or more protocol devices connected to the data response device through the second transmission protocol through the bus of the first transmission protocol connected to the data response device, wherein the data response device and the one or more protocol devices are configured to perform data synchronization on the data at the target location in response to the first request.

14. The method according to claim 10, wherein the receiving the information returned by the data response device after performing the transmission operation on the first storage space comprises:

sending a second request of the first transmission protocol to the data response device, wherein the second request is configured to request to perform the transmission operation on data at a target location in the first storage space; and receiving the information returned by the data response device in response to the second request.

15. The method according to claim 14, wherein before sending the second request of the first transmission protocol to the data response device, the method further comprises:

performing data synchronization on a third storage space and a fourth storage space in response to the transmission operation comprising a data write operation, wherein the third storage space is configured to store data on which the data write operation is performed, and the fourth storage space is configured to store partial data in the third storage space.

16. The method according to claim 15, wherein the performing data synchronization on the third storage space and the fourth storage space comprises:

obtaining second protocol information of the second transmission protocol in response to the data on which the data write operation is performed being stored in the fourth storage space, wherein the second protocol information is configured to indicate a data synchronization situation between the third storage space and the fourth storage space; and performing data synchronization on the third storage space and the fourth storage space according to the second protocol information.

17. A data transmission system, comprising: a data request device and a data response device, wherein a first storage space and a second storage space are deployed on the data response device, both the data request device and the data response device support a first transmission protocol, and the data response device further supports a second transmission protocol, wherein the second transmission protocol is configured to maintain data synchronization between the second storage space and the first storage space;

the data request device is configured to perform steps of the method described in claim 10; and the data response device is configured to perform steps of the method described in claim 1.

18. A non-transitory readable storage medium, wherein the non-transitory readable storage medium stores a computer program, wherein the computer program, when executed by a processor, implements steps of the method described in claim 1.

19. An electronic device, comprising: a memory, a processor and a computer program stored on the memory and executable on the processor, wherein the computer program, when executed by the processor, causes the processor to implement steps of the method described in claim 1.

20. The electronic device according to claim 19, wherein the processor is further configured to implement operations comprising:

requesting to invoke the first protocol information of the second transmission protocol to the data response device; and querying the target storage state of the target data from the first protocol information of the second transmission protocol in response to the data response device allowing the first protocol information of the second transmission protocol to be invoked.

* * * * *